(12) United States Patent
Chen et al.

(10) Patent No.: US 12,299,565 B2
(45) Date of Patent: May 13, 2025

(54) DATA PROCESSING METHOD AND DEVICE FOR BIT-NUMBER REDUCTION IN A NEURAL NETWORK BY ESTABLISHING BIT UPPER BOUND AND BIT LOWER BOUND USING DISTRIBUTION INFORMATION

(71) Applicant: INDUSTRIAL TECHNOLOGY RESEARCH INSTITUTE, Hsinchu (TW)

(72) Inventors: Chao-Hung Chen, Tainan (TW); Ming-Chun Hsyu, Taipei (TW); Chien-Chih Huang, Taoyuan (TW); Wen-Pin Hsu, New Taipei (TW); Chun-Te Yu, Yunlin County (TW)

(73) Assignee: INDUSTRIAL TECHNOLOGY RESEARCH INSTITUTE, Hsinchu (TW)

( * ) Notice: Subject to any disclaimer, the term of this patent is extended or adjusted under 35 U.S.C. 154(b) by 1139 days.

(21) Appl. No.: 17/135,793

(22) Filed: Dec. 28, 2020

(65) Prior Publication Data
US 2022/0207346 A1    Jun. 30, 2022

(51) Int. Cl.
*G06N 3/08* (2023.01)
*G06F 7/50* (2006.01)
(Continued)

(52) U.S. Cl.
CPC ............... *G06N 3/08* (2013.01); *G06F 7/50* (2013.01); *G06F 7/523* (2013.01); *G06F 18/2193* (2023.01)

(58) Field of Classification Search
None
See application file for complete search history.

(56) References Cited

U.S. PATENT DOCUMENTS

| 9,916,531 B1 | 3/2018 | Zivkovic et al. |
| 10,373,050 B2 | 8/2019 | Lin et al. |

(Continued)

FOREIGN PATENT DOCUMENTS

| CN | 109389219 A | 2/2019 |
| CN | 110009101 A | 7/2019 |

(Continued)

OTHER PUBLICATIONS

Tanenbaum, Structured Computer Organization, 2nd Edition; Publisher: Prentice-Hall, Inc.; 1984; Total pp. 4 (Year: 1984).*

(Continued)

*Primary Examiner* — Alan Chen
(74) *Attorney, Agent, or Firm* — Birch, Stewart, Kolasch & Birch, LLP

(57) ABSTRACT

A data processing method used in neural network computing is provided. During a training phase of a neural network model, a feedforward procedure based on a calibration data is performed to obtain distribution information of a feedforward result for at least one layer of the neural network model. During the training phase of the neural network model, a bit upper bound of a partial sum is generated based on the distribution information of the feedforward result. During an inference phase of the neural network model, a bit-number reducing process is performed on an original operation result of an input data and a weight for the neural network model according to the bit upper bound of the partial sum to obtain an adjusted operation result.

17 Claims, 7 Drawing Sheets

(51) Int. Cl.
*G06F 7/523* (2006.01)
*G06F 18/21* (2023.01)

(56) References Cited

U.S. PATENT DOCUMENTS

| | | | |
|---|---|---|---|
| 10,592,799 | B1 | 3/2020 | Kim et al. |
| 10,621,486 | B2 | 4/2020 | Yao |
| 10,678,508 | B2 | 6/2020 | Vantrease et al. |
| 2017/0286830 | A1 | 10/2017 | El-Yaniv et al. |
| 2019/0340492 | A1 | 11/2019 | Burger et al. |
| 2019/0347550 | A1* | 11/2019 | Jung ................... G06N 3/08 |
| 2019/0354842 | A1 | 11/2019 | Louizos et al. |
| 2020/0026986 | A1 | 1/2020 | Ha et al. |
| 2020/0193270 | A1 | 6/2020 | Wu et al. |

FOREIGN PATENT DOCUMENTS

| | | |
|---|---|---|
| TW | 201933193 A | 8/2019 |
| TW | 202022798 A | 6/2020 |

OTHER PUBLICATIONS

Bilaniuk et al., Bit-Slicing FPGA Accelerator for Quantized Neural Networks, IEEE, 2019; Total pp. 5 (Year: 2019).*

Hubara et al., Quantized Neural Networks: Training Neural Networks with Low Precision Weights and Activations, Journal of Machine Learning Research 18 (2018); pp. 1-30 (Year: 2018).*

Yu et al., Low-bit Quantization Needs Good Distribution, Computer Vision Foundation, 2020; pp. 1-10 (Year: 2020).* de Bruin et al., "Quantization of Deep Neural Networks for Accumulator-constrained Processors", arXiv:2004.11783v1 [cs.CV] Apr. 24, 2020, 20 pages.

Han et al., "Deep Compression: Compressing Deep Neural Networks With Pruning, Trained Quantization and Huffman Coding", Published as a conference paper at ICLR 2016, arXiv:1510.00149v5 [cs.CV] Feb. 15, 2016, 14 pages.

Hubara et al., "Quantized Neural Networks: Training Neural Networks with Low Precision Weights and Activations", arXiv:1609.07061v1 [cs.NE] Sep. 22, 2019, 29 pages.

Jacob et al., "Quantization and Training of Neural Networks for Efficient Integer-Arithmetic-Only Inference", arXiv:1712.05877v1 [cs.LG] Dec. 15, 2017, 14 pages.

Lin et al., "Fixed Point Quantization of Deep Convolutional Networks", Proceedings of the 33rd International Conference on Machine Learning, New York, JMLR: W&CP vol. 48, Jun. 2, 2016, 10 pages.

Louizos et al., "Relaxed Quantization for Discretized Neural Networks", arXiv:1810.01875v1 [cs.LG] Oct. 3, 2018, 14 pages.

* cited by examiner

DATA PROCESSING METHOD AND DEVICE FOR BIT-NUMBER REDUCTION IN A NEURAL NETWORK BY ESTABLISHING BIT UPPER BOUND AND BIT LOWER BOUND USING DISTRIBUTION INFORMATION

TECHNICAL FIELD

The disclosure relates in general to data processing method and device, and more particularly to data processing method and device used in neural network computing.

BACKGROUND

Nowadays, neural networks have been widely used in various image and speech recognition fields, and have achieved good results. However, high-accuracy neural networks may not be suitable for real-time application scenarios or end devices. For example, in order to achieve real-time image recognition with processing at least 30 images per second, it may be necessary to optimize the neural networks with considering the limitation of the hardware resource. Therefore, it has become an important task for the industries to reducing the hardware resource needed for the neural network computing.

SUMMARY

The disclosure is directed to a data processing method used in neural network computing. The method includes the following steps. During a training phase of a neural network model, a feedforward procedure based on a calibration data is performed to obtain distribution information of a feedforward result for at least one layer of the neural network model. During the training phase of the neural network model, a bit upper bound of a partial sum is generated based on the distribution information of the feedforward result. During an inference phase of the neural network model, a bit-number reducing process is performed on an original operation result of an input data and a weight for the neural network model according to the bit upper bound of the partial sum to obtain an adjusted operation result.

According to one embodiment, a data processing device used for a neural network computing is provided. The data processing device includes a first operation circuit, an adjusting circuit, a second operation circuit, and a storing circuit. The first operation circuit is configured for receiving an input data and a weight for a neural network model and outputting a first operation result. The adjusting circuit is configured for performing bit-number reduced operation on the first operation result according to a bit upper bound of a partial sum to obtain a second operation result during an inference phase of the neural network model. The second operation circuit is configured for receiving the second operation result and a third operation result to generate a fourth operation result. The storing circuit is configured for storing the fourth operation result. The bit upper bound of the partial sum is generated based on distribution information of a feedforward result obtained by performing feedforward procedure based on calibration data for at least one layer of the neural network model during a training phase of the neural network model.

Figure 1:
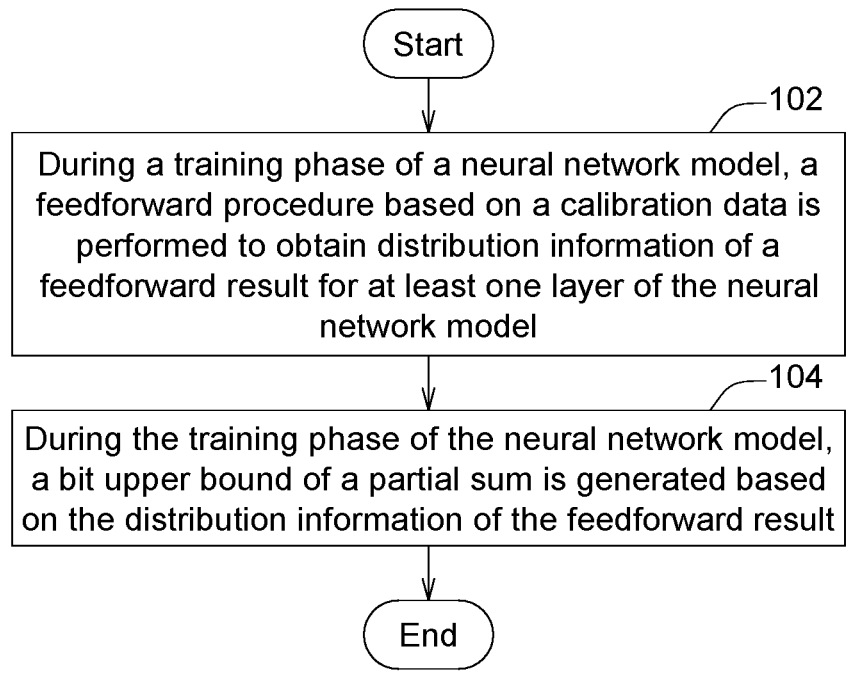
FIG. 1 shows a flow chart of a data processing method used in neural network computing according to an embodiment of the disclosure.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

DETAILED DESCRIPTION

In order to reduce the hardware resource needed for the neural network computing, some neural network optimization technologies include Model Pruning, Model Quantization, Binary Neural Networks, Network Architecture Search, and so on, have been provided. The goal of these technologies may be to reduce the amount of computation or the precision of calculations, so that the hardware can perform multiplication and addition operations with less resources and acceptable accuracy of prediction.

Since the neural network usually require large amount of parameters and FLOPs (floating point operations) for high accuracy, this may demand much hardware computing resources. However, the resources of end devices are limited. When applying deep neural networks (DNN), latency and memory usage may be considered. Therefore, it has become a task for the industries to reduce the amount of computation and parameters to speed up the inference procedure of the neural network model without losing too much accuracy.

Referring to FIG. 1, the flow chart of a data processing method used in neural network computing is shown. The method begins at step 102, during a training phase of a neural network (NN) model, a feedforward procedure based on a calibration data is performed to obtain distribution information of a feedforward result for at least one layer of the neural network model. Then, in step 104, during the training phase of the neural network model, a bit upper bound of a partial sum is generated based on the distribution information of the feedforward result. During an inference phase of the neural network model, a bit-number reducing process is performed on an original operation result of an input data and a weight for the neural network model according to the bit upper bound of the partial sum to obtain an adjusted operation result.

The input data and the weight are in the form of integer. The original operation result and the adjusted operation result are, for example, in the form of integer, and the original operation result of the input data and the weight is the result of at least one of convolution operation, multiplication operation, matrix multiplication operation, dot product operation, and accumulation operation for the input data and the weight, for example. The term "partial sum" means that the adjusted operation result has partial content of the original operation result after the bit-number reducing process is performed on the original operation result according to the bit upper bound of the partial sum.

When the weight is originally a floating point value, the weight are converted (for example, quantized) to be an integer value. Through the calculation of integers instead of floating point values companying with the bit-number reducing process, inference procedure of the neural network model can be sped up, the amount of memory access and the memory size needed are reduced, and the hardware with the same area can have more processing units.

Figure 2:
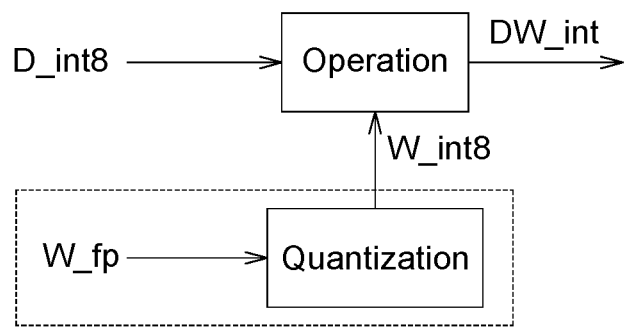
FIG. 2 shows an example of data processing in neural network computing.

Referring to FIG. 2, an example of data processing in neural network computing is illustrated. An input data D_int8 (for example, a feature map or activation) is in the form of integer. For example, the input data D_int8 includes a value between 0 and 255 represent by 8-bit binary value $(00000000)_2$ to $(11111111)_2$ for an image captured by a camera. The weight W_fp for the neural network is in the form of floating point value which needs to be stored in more than 8 bits of memory. The weight W_fp is converted to the integer weight W_int8 (8-bit binary value) through quantization. After operation (for example, convolution or matrix multiplication) of the input data D_int8 and the integer weight W_int8, the operation result DW_int is obtained. Since the number of bits needed for representing the value of the operation result DW_int may be more than 8 bits, 32-bit memory is often used for storing the operation result DW_int and the operation result DW_int is in the form of 32-bit binary value. After bit-number reducing process, the operation result DW_int of lower than 32-bit binary value can be obtained.

Figure 3:
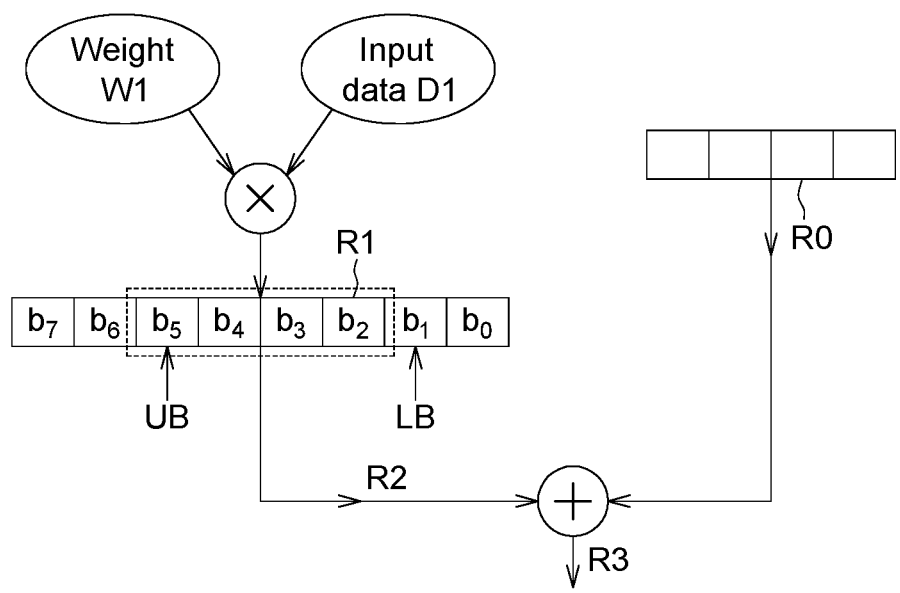
FIG. 3 shows an example for the bit-number reducing process.

The bit-number reducing process which converting the operation result DW_int of 32-bit binary value to the operation result DW_int with lower than 32-bit binary value will be explained as follows. Refer to FIG. 3, which shows an example for the bit-number reducing process. For simplifying the explanation, the operation result R1 of 8-bit integer for the input data D1 and the weight W1 is taken for example. In bit-number reducing process, when the binary value is larger than the value which can be represented by the binary value having the bit upper bound UB as the MSB (Most Significant Bit), this binary value will be performed with saturation procedure and the bit content of this binary value in the locations which is in the left of the bit upper bound UB will be omitted. Besides, in bit-number reducing process, when the binary value is smaller than the value which can be represented by the binary value having the bit upper bound UB as the MSB, this binary value will be performed with saturation procedure and the bit content of this binary value in the locations which is in the left of the bit upper bound UB will be omitted directly.

"Saturation procedure" mentioned above means that the binary value will be converted to the largest binary value having the bit upper bound UB as the MSB. For example, assume the operation result R1 of 8-bit integer is represented by $(b_7 b_6 b_5 b_4 b_3 b_2 b_1 b_0)_2$ and assume the bit upper bound is 6 (corresponding to $b_5$) which points to location of the sixth bit of the 8-bit binary value counting from the LSB (least significant bit) "$b_0$" toward left. Through the bit-number reducing process, when the value of at least one of $b_7$ and $b_6$ is "1" in the operation result R1, which means this binary value $(b_7 b_6 b_5 b_4 b_3 b_2 b_1 b_0)_2$ is larger than the value which can be represented by the binary value $(b_5 b_4 b_3 b_2 b_1 b_0)_2$ having the bit upper bound UB (corresponding to $b_5$) as the MSB, saturation procedure will be performed to the operation result R1 $(b_7 b_6 b_5 b_4 b_3 b_2 b_1 b_0)_2$ and the operation result R1 will be converted to the largest binary value $(b_5 b_4 b_3 b_2 b_0)_2$ having the bit upper bound UB as the MSB, that is $(111111)_2$, for example. On the contrary, when the values of $b_7$ and $b_6$ in the operation result R1 are both "0", which means the operation result R1 $(b_7 b_6 b_5 b_4 b_3 b_2 b_0)_2$ can be represented by the binary value $(b_5 b_4 b_3 b_2 b_0)_2$ having the bit upper bound UB (corresponding to $b_5$) as the MSB, the bits of $b_7$ and $b_6$ are omitted in the operation result R1 and the binary value $(b_5 b_4 b_3 b_2 b_0)_2$ is outputted. That is, the operation result R1 will be converted to an adjusted operation result R1' of the binary value having the bit upper bound UB as the MSB, that is $(b_5 b_4 b_3 b_2 b_0)_2$, for example.

The data processing method used in neural network computing as shown in FIG. 1 can further include the step of generating a bit lower bound LB of the partial sum by deducting a bit width of an accumulator from the bit upper bound UB of the partial sum. Take the operation result R1 of 8-bit integer for the input data D1 and the weight W1 in FIG. 2 for example. The bit-number reducing process is performed further by considering the bit lower bound LB of the partial sum. That is, during the bit-number reducing process, the bit(s) in the location pointed by the bit lower bound LB and the bit(s) in the location right to the location pointed by the bit lower bound LB are omitted. For example, the original binary value will be converted to the adjusted binary value through shifting right by the number of bit(s) according to the bit lower bound LB. For example, after the bit-number reducing process is performed to the operation result R1, the operation result R1 is converted to the adjusted operation result R1' of $(b_5 b_4 b_3 b_2 b_0)_2$. Assume the bit lower bound LB is 2 and points to the location of the second bit "$b_1$". Then, the bit-number reducing process is further performed with considering the bit lower bound LB, and the content of $(b_1 b_0)_2$ in the adjusted operation result R1' of $(b_5 b_4 b_3 b_2 b_1 b_0)_2$ is omitted (for example, the adjusted operation result R1' is shifted right according to the bit lower bound LB, that is 2 bits). Then, the operation result R2 of $(b_5 b_4 b_3 b_2)_2$ is obtained. Therefore, after the bit-number reducing process is perform with considering both of the bit upper bound UB and the bit lower bound LB, the operation result R2 of $(b_5 b_4 b_3 b_2)_2$ which is of 4-bit binary value is obtained.

After that, the data processing of the neural network model may further include addition operation. The operation result R2 may be further added with a previous operation result R0 to obtain an operation result R3. Since the previous operation result R0 is the binary value on which the bit-number reducing process has been performed, the previous operation result R0 has the same number of bits with the operation result R2, that is, 4 bits in the example of FIG. 3. Therefore, the operation result R3 may have the same number of bits, that is, 4 bits. Since the operation results R2 and R3 are of reduced number of bits, memory for storing the operation results R2 and R3 can be also of the reduced number of bits, for example, 4 bits. With the operation results R2 and R3 which are bit-number reduced, the calculation for the operation results R2 and R3 is simplified and the size of the memories for storing the operation results R2 and R3 is reduced.

Figure 4:
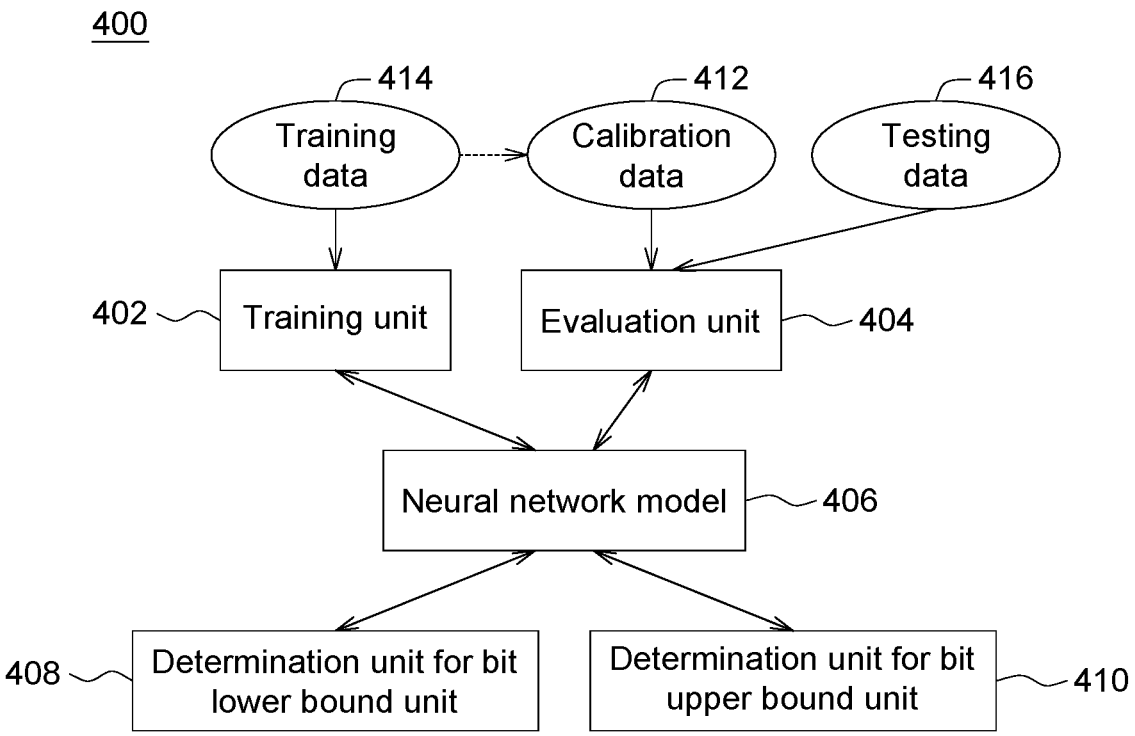
FIG. 4 shows the system for the data processing method used in the neural network shown in FIG. 1.
Figure 5:
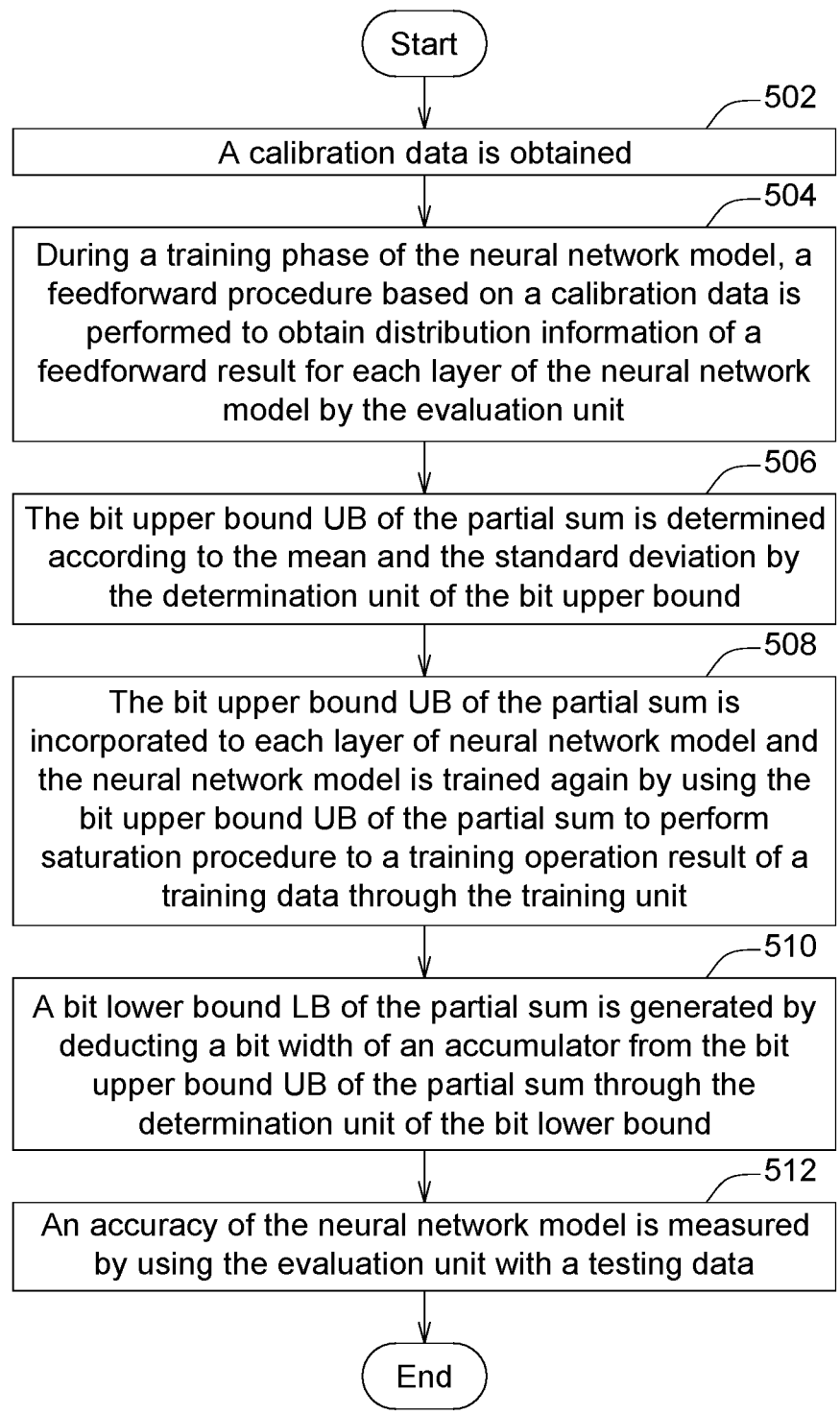
FIG. 5 illustrates the flow chart of the details for the data processing method used in the neural network shown in FIG. 1.

Referring to FIG. 4 and FIG. 5, FIG. 4 shows the system for the data processing method used in the neural network shown in FIG. 1, and FIG. 5 illustrates the flow chart of the details for the data processing method used in the neural network shown in FIG. 1. As shown in FIG. 4, system 400 includes a training unit 402, an evaluation unit 404, a neural network model 406, a determination unit for bit lower bound 408, and a determination unit for bit upper bound 410.

In step 502, a calibration data 412 is obtained. For example, the calibration data is obtained by picking some data from the training data 414. In step 504, during the training phase of the neural network model, a feedforward procedure based on a calibration data 412 is performed to obtain distribution information of a feedforward result for each layer of the neural network model 406 by the evaluation unit 404. The distribution information of the feedforward result for each layer of the neural network model 406 is recorded. The distribution information of the feedforward result at least includes a mean and a standard deviation. The neural network model 406 is a pre-trained neural network model, for example.

In step 506, the bit upper bound UB of the partial sum is determined according to the mean and the standard deviation by the determination unit of the bit upper bound 410. Furthermore, the bit upper bound of the partial sum is related to a binary logarithm of a value which is the mean plus N times of the standard deviation, N is an integer. For example, the bit upper bound of the partial sum UB is calculated based on the following equation 1 and equation 2:

$$V = \max(\text{abs}(\mu + N \times STD), \text{abs}(\mu - N \times STD)) \quad \text{(equation 1)}$$

$$UB = \text{ceil}(\log_2(V)) + 1 \quad \text{(equation 2)}$$

"V" is a real number, "p" represents "mean" of the result, and "STD" represents "standard deviation". "N" is an integer. "UB" represents the bit upper bound and "LB" represents the bit lower bound. The function "max(a, b)" is to select the maximum from the values a and b in the parentheses, the function "abs(x)" is to output the absolute value of x, and the function "ceil(y)" maps y to the least integer greater than or equal to y. The above variations a, b, x, and y are provided for the explanation of functions.

In step 508, the bit upper bound UB of the partial sum is incorporated to each layer of neural network model 406 and the neural network model 406 is trained again (for example, fine-tuned) by using the bit upper bound UB of the partial sum to perform saturation procedure to a training operation result of a training data 414 through the training unit 402. The training operation result of the training data 414 is the result when the training data 414 is applied to train the neural network model 406. After the neural network model 406 is trained again by using the bit upper bound UB, the accuracy of the neural network model 406 will be improved.

In step 510, a bit lower bound LB of the partial sum is generated by deducting a bit width of an accumulator from the bit upper bound UB of the partial sum through the determination unit of the bit lower bound 408. For example, the bit lower bound LB of the partial sum can be calculated based on the following equation 3, where $BW_{acc}$ represents the bit width of accumulator in hardware:

$$LB = UB - BW_{acc} \quad \text{(equation 3)}$$

Table 1 below provides an example of the values of mean μ and standard deviation STD in the distribution information of a feedforward result and corresponding bit upper bound UB and bit lower bound LB for different layers L1, L2, and L3 of the neural network model. Assume the original operation result Rx is $(b_{j-1} \ b_{j-2} \ldots b_2 \ b_1 \ b_0)_2$, UB is the value between 1 and j, and LB is the value between 1 and UB. Len N equal to 2. L1, L2, and L3 represent three different layers of the neural network model. The bit width of accumulator $BW_{acc}$ isassumed to be 8 bits in hardware.

TABLE 1

| Layer | μ | STD | UB | LB |
|---|---|---|---|---|
| L1 | 0 | 8000 | 15 | 7 |
| L2 | 0 | 4000 | 14 | 6 |
| L3 | 0 | 11000 | 16 | 8 |

Figure 6:
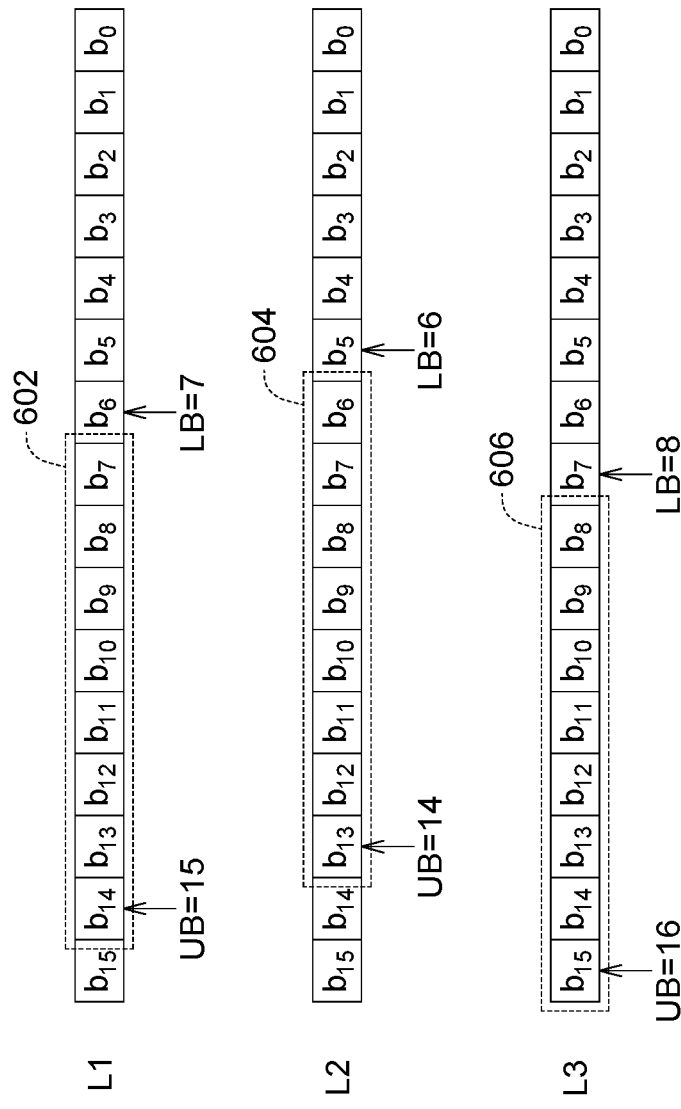
FIG. 6 illustrates the examples showing the relation of the original operation result Rx, UB and LB in Table 1.

Refer to FIG. 6, the examples showing the relation of the original operation result Rx, UB and LB in Table 1 is illustrated. Assume j=16 for the original operation result Rx is $(b_{j-1} \ b_{j-2} \ldots b_2 \ b_1 \ b_0)_2$. For the first layer L1, the adjusted operation result Ra1 is $(b_{14} \ b_{13} \ldots b_9 \ b_8 \ b_7)_2$ as indicated by block 602 for UB=15 and LB=7. For the second layer L2, the adjusted operation result Ra2 is $(b_{13} \ b_{12} \ldots b_8 \ b_7 \ b_6)_2$ as indicated by block 604 for UB=14 and LB=6. For the third layer L3, the adjusted operation result Ra3 is $(b_{15} \ b_{14} \ b_9 \ b_8)_2$ as indicated by block 606 for UB=16 and LB=8.

In step 512, an accuracy of the neural network model 406 is measured by using the evaluation unit 404 with a testing data 416. Furthermore, the neural network model 406 can be trained again (for example, fine-tuned) by using the bit upper bound UB and the bit lower bound LB of the partial sum to perform saturation procedure to the training operation result of the training data 414. Or, the neural network model 406 can be trained again by using the bit upper bound UB and the bit lower bound LB of the partial sum to perform saturation procedure to the training operation result of the training data 414 when the accuracy of the neural network model 406 is lower than a threshold.

When the bit lower bound LB of the partial sum is not used, the value of the bit upper bound UB is preferably equal or smaller than a bit width of an accumulator in hardware. When the bit lower bound LB of the partial sum is used, the value of the bit upper bound UB may be preferably larger than the bit width of the accumulator in hardware.

Figure 7:
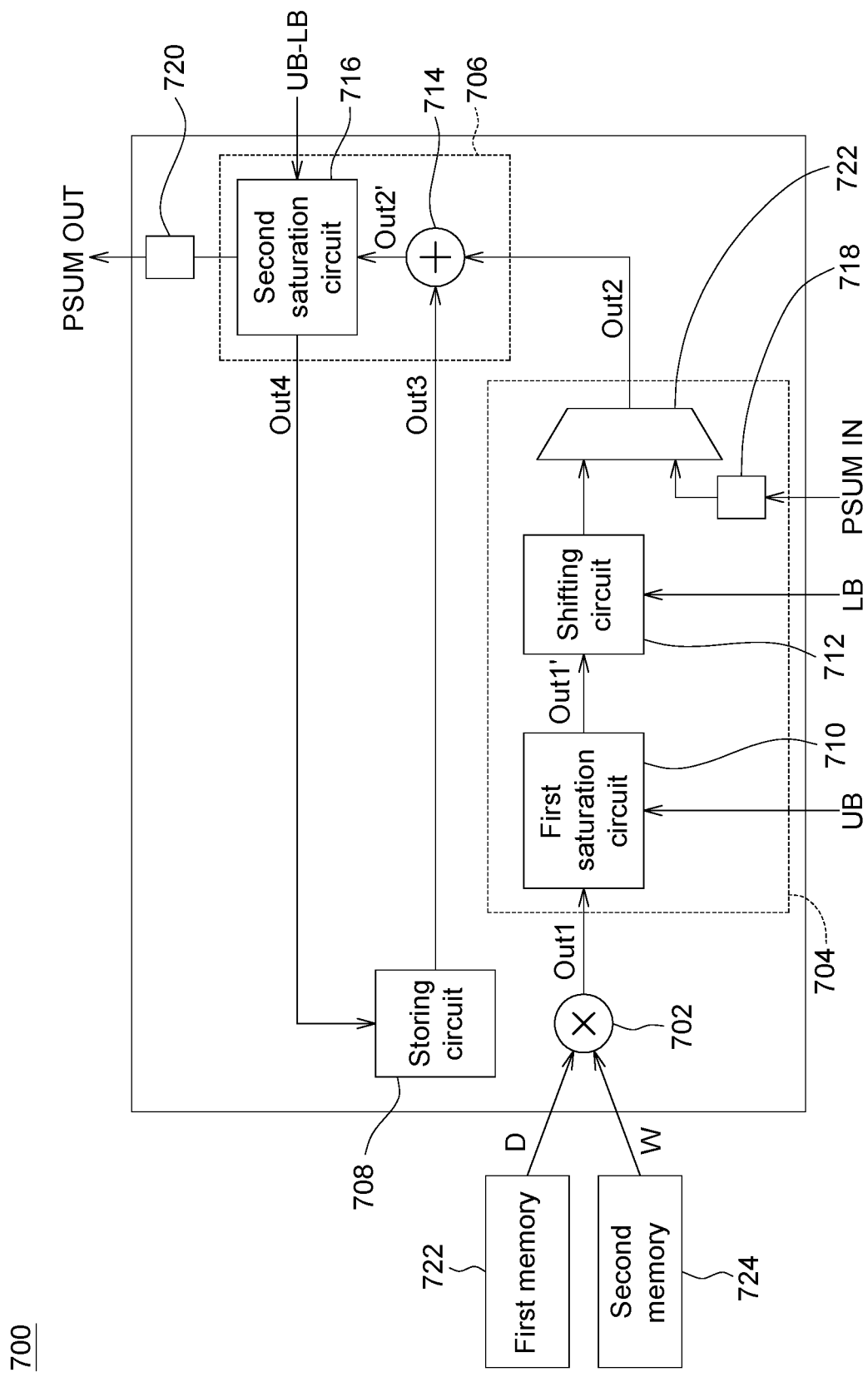
FIG. 7 shows a block diagram of a data processing device used in neural network computing.

The disclosure further provides a data processing device used in neural network computing. Refer to FIG. 7, a block diagram of a data processing device 700 used in neural network computing is shown. The data processing device 700 includes a first operation circuit 702, an adjusting circuit 704, a second operation circuit 706, and a storing circuit 708. The first operation circuit 702 receives an input data D (for example, a feature map obtained from camera or other image data, or activation) and a weight W for a neural network model and outputting a first operation result Out1. The adjusting circuit 704 performs bit-number reducing process on the first operation result Out 1 according to a bit upper bound UB of a partial sum to obtain a second operation result Out2 during an inference phase of the neural network model. The second operation circuit 706 receives the second operation result Out2 and a third operation result Out3 to generate a fourth operation result Out4. The storing circuit 708 stores the fourth operation result Out4. The bit upper bound UB of the partial sum is generated based on distribution information of a feedforward result obtained by performing feedforward procedure based on calibration data for at least one layer of the neural network model during a training phase of the neural network model.

The first operation circuit 702, for example, includes a multiplier. The first operation result Out1 is the multiplication of the input data D and the weight W. The adjusting circuit 704, for example, includes a first saturation circuit 710 for performing saturation procedure on the first operation result Out1 according to the bit upper bound UB of the partial sum to generate the saturated operation result Out1'. The adjusting circuit 704 may further include a shifting circuit 712 for performing shifting operation on the saturated operation result Out1' from the first saturation circuit 710. The shifting operation is performed according to a bit lower bound LB of the partial sum. The bit upper bound UB and the bit lower bound LB can be generated according to the ways mentioned above.

Preferably, the input data D and the weight W are in the form of integer. The first operation result Out1, the second operation result Out2, the third operation result Out3, and the fourth operation result Out4 are in the form of integer.

The second operation circuit 706 can include an adder 714 which adding the second operation result Out2 and the third operation result Out3. The second operation circuit 706 can further includes a second saturation circuit 716 which performs saturation procedure on an output Out2' of the adder 714 according to the difference value of the bit upper bound UB of the partial sum and the bit lower bound LB of the partial sum (that is, UB-LB). Therefore, when the value of the output Out2' of the adder 714 is larger than the value which can be represented by the number of bits of UB-LB, the value of the output Out2' will be converted to the largest value which can be represent by the value having the number of bits of UB-LB.

The data processing device 700 can further includes an input pad 718 and an output pad 720. The input pad 718 is configured to receive a partial sum PSUM IN from other source (for example, other processing unit), and the output pad 720 is configured to output a partial sum PSUM OUT. The partial sum PSUM OUT may be outputted to other processing unit, for example, for further processing. Optionally, the data processing device 700 further includes a first memory 722 for storing the input data D and a second memory 724 for storing the weight W. The data processing device 700 can optionally include a multiplexer 722 for choosing one of the output from the shifting circuit 712 and the partial sum PSUM IN to be the second operation result Out2.

Figure 8:
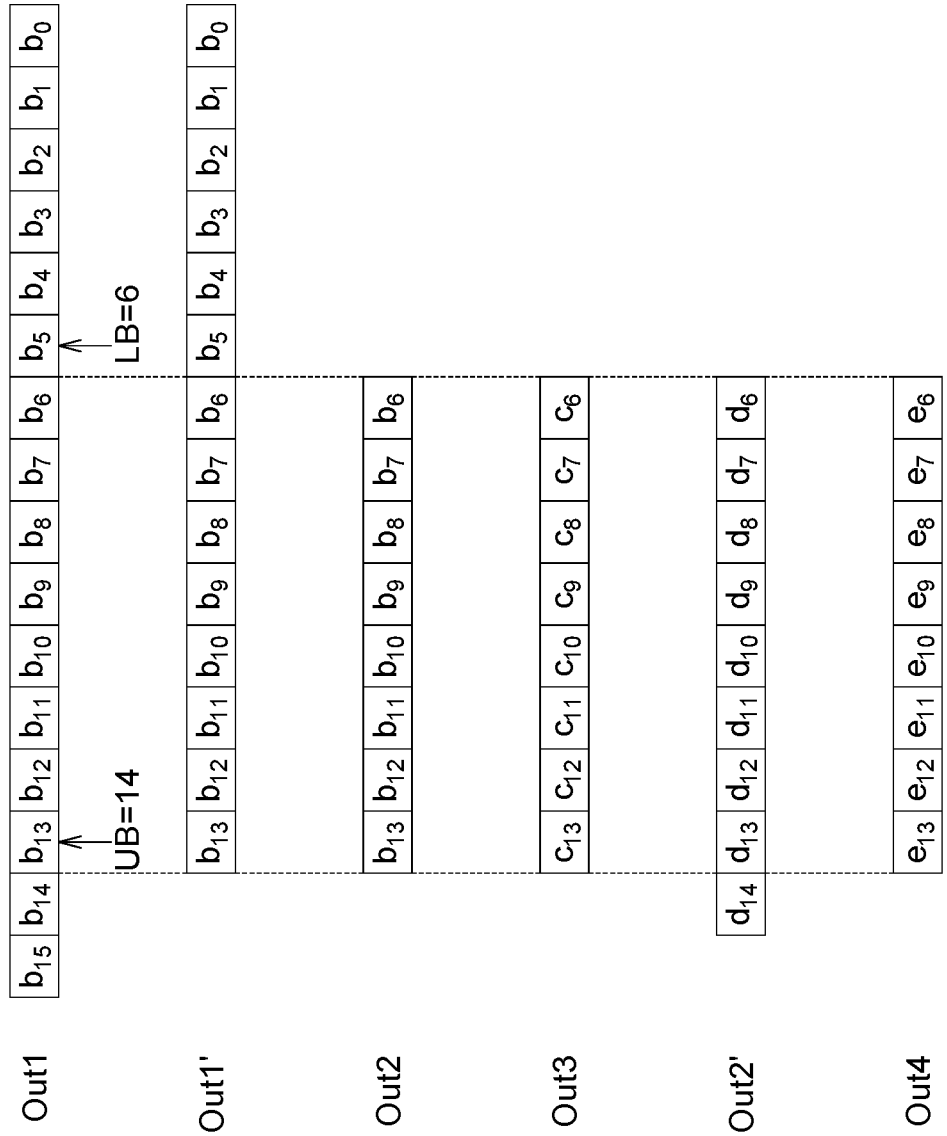
FIG. 8 shows an example of the first operation result Out1, the saturated operation result Out1', the second operation result Out2, the output Out2', the third operation result Out3, and the fourth operation result Out4.

Refer to FIG. 8, an example of the first operation result Out1, the saturated operation result Out1', the second operation result Out2, the output Out2', the third operation result Out3, and the fourth operation result Out4 is shown. Assume the first operation result Out1 of 16 bits is $(b_{15} b_{14} b_2 b_1 b_0)_2$ and UB=14 and LB=6. After the saturation procedure is performed by the first saturation circuit 710, the saturated operation result Out1' of $(b_{13} b_{12} \ldots b_2 b_0)_2$ is generated. After the shifting operation performed by the shifting circuit 712, the content of $(b_5 b_4 b_3 b_2 b_1 b_0)_2$ is shifted out and the second operation result Out2 is $(b_{13} b_{12} b_8 b_7 b_6)_2$ is outputted to the adder 714. After the adder 714 adds the second operation result Out2 of $(b_{13} b_{12} b_8 b_7 b_6)_2$ with the third operation result Out3 of $(c_{13} c_{12} \ldots C_8 c_7 c_6)_2$, the output Out2' of $(d_{14} d_{13} d_{12} d_8 d_7 d_6)_2$ may be obtained. Then, the second saturation circuit 716 performs saturation procedure according to the value of "UB-LB" and generates the fourth operation result Out4 of $(e_{13} e_{12} e_8 e_7 e_6)_2$. Since the first operation result Out1, the second operation result Out2, the third operation result Out3, and the fourth operation result Out4 are the binary value of 8 bits, the amount of computation is reduced, the inference procedure of the neural network model is sped up, and the size of hardware area (for example, the size of memory, the size of multiplier, and the size of adder) for the neural network model is reduced.

Figure 9:
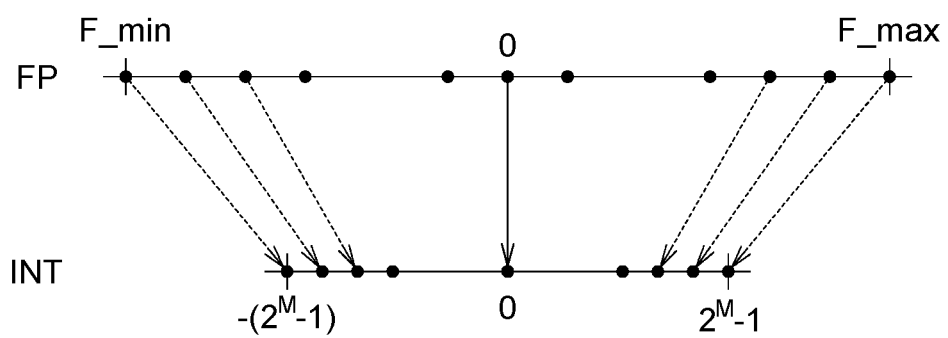
FIG. 9 illustrates an example of quantization.

Referring to FIG. 9, an example of quantization is illustrated. When the weight is originally a floating point value, the weight are converted (for example, quantized) to be an integer value. The quantization process can include the following steps. First, the number of bits (M) to be quantized is determined. Then, a range of the floating-point value FP is selected. For example, the range can be defined by the maximum value F_max and the minimum value F_min of the floating-point value. After that, the range defined by the maximum value F_max and the minimum value F_min are divided into $2^M$ levels according to the selected range of the floating-point values. Then, all floating-point values FP are converted to integer values INT according to the corresponding level for the floating-point values FP.

Referring to Table 2 below, the experimental results for image classification by using Resnet 50 model and for object detection by using Yolo V2 model are listed. The number of bits of weight, the number of bits of input data, the number of bits of partial sum, and the accuracy/mAP (mean average precision) are listed. It can be observed that the accuracy/mAP of image classification is reduced from 74.9% to 73.8% (the difference is 74.9%-73.8% =1.1%) when the bit upper bound UB is used, and the accuracy/mAP of image classification is reduced from 74.9% to 73.7% (the difference is 74.9%-73.7% =1.2%) when both the bit upper bound UB and the bit lower bound LB are used. Besides, it can also be observed that the accuracy/mAP of object detection is reduced from 72.9% to 72.5% (the difference is 72.9%-72.5% =0.4%) when the bit upper bound UB is used, and the accuracy/mAP of object detection is reduced from 72.9% to 72.4% (the difference is 72.9%-72.4% =0.5%) when both the bit upper bound UB and the bit lower bound LB are used. It is noted that the accuracy is almost the same even the number of bits for partial sum is reduced by using the bit upper bound UB and the bit lower bound LB.

TABLE 2

| | Number of bits of weight | Number of bits of Input data | Number of bits of partial sum | Accuracy/mAP |
|---|---|---|---|---|
| Image classification (Resnet 50 model) | 8 | 8 | None | 74.9% |
| | 8 | 8 | 16 (UB) | 73.8% |
| | 8 | 8 | 16, 8(UB/LB) | 73.7% |
| Object detection (Yolo V2 model) | 7 | 8 | None | 72.9% |
| | 7 | 8 | 16(UB) | 72.5% |
| | 7 | 8 | 16, 8(UB/LB) | 72.4% |

Regarding to the aspect of area of hardware, the area for single process unit (PE) in Eyeriss v2 (a flexible accelerator for emerging deep neural networks on mobile devices) will be reduced by 11.2% when number of bits of the partial sum is reduced from 20 bit to 8 bit. Therefore, the data processing method and device used in neural network computing according to the embodiment of the disclosure can reduce the amount of computation to speed up the inference procedure.

It will be apparent to those skilled in the art that various modifications and variations can be made to the disclosed embodiments. It is intended that the specification and examples be considered as exemplary only, with a true scope of the disclosure being indicated by the following claims and their equivalents.

What is claimed is:

1. A data processing method used in neural network computing, comprising:
during a training phase of a neural network model, performing a feedforward procedure based on a calibration data to obtain a distribution information of a feedforward result for at least one layer of the neural network model;
during the training phase of the neural network model, generating a bit upper bound of a partial sum based on the distribution information of the feedforward result; and
generating a bit lower bound of the partial sum by deducting a bit width of an accumulator from the bit upper bound of the partial sum;
wherein during an inference phase of the neural network model, a bit-number reducing process is performed on an original operation result of an input data and a weight for the neural network model according to the bit upper bound of the partial sum to obtain an adjusted operation result.

2. The method according to claim 1, wherein the neural network model used for performing feedforward procedure based on the calibration data to obtain the distribution information of the feedforward result is a pre-trained neural network model.

3. The method according to claim 1, wherein the distribution information of the feedforward result at least comprises a mean and a standard deviation, the bit upper bound of the partial sum is determined according to the mean and the standard deviation.

4. The method according to claim 3, wherein the bit upper bound of the partial sum is related to a binary logarithm of a value which is the mean plus N times of the standard deviation, N is an integer.

5. The method according to claim 1, further comprising:
training the neural network model again by using the bit upper bound of the partial sum to perform saturation procedure to a training operation result of a training data through a training unit.

6. The method according to claim 1, further comprising:
training the neural network model again by using the bit upper bound and the bit lower bound of the partial sum to perform saturation procedure to a training operation result of a training data.

7. The method according to claim 1, further comprising:
measuring accuracy by using an evaluation unit with testing data, and training the neural network model again by using the bit upper bound and the bit lower bound of the partial sum to perform saturation procedure to a training operation result of a training data when the accuracy is lower than a threshold.

8. The method according to claim 1, wherein the input data and the weight are in a form of integer, the original operation result, the adjusted operation result are in the form of integer, and the original operation result of the input data and the weight is the result of at least one of convolution operation, multiplication operation, matrix multiplication operation, dot product operation, and accumulation operation for the input data and the weight.

9. The method according to claim 1, wherein a value of the bit upper bound is equal or smaller than a bit width of an accumulator in hardware.

10. A data processing device used in neural network computing, comprising:
a first operation circuit, for receiving an input data and a weight for a neural network model and outputting a first operation result;
an adjusting circuit, for performing bit-number reduced operation on the first operation result according to a bit upper bound of a partial sum to obtain a second operation result during an inference phase of the neural network model;
a second operation circuit, for receiving the second operation result and a third operation result to generate a fourth operation result; and
a storing circuit, for storing the fourth operation result;
wherein the bit upper bound of the partial sum is generated based on distribution information of a feedforward result obtained by performing feedforward procedure based on calibration data for at least one layer of the neural network model during a training phase of the neural network model;
wherein the adjusting circuit comprises a first saturation circuit for performing saturation procedure on the first operation result according to the bit upper bound of the partial sum;
wherein the adjusting circuit further comprises a shifting circuit for performing shifting operation on an output of the first saturation circuit, the shifting operation is performed according to a bit lower bound of the partial sum which is generated by deducting a bit width of an accumulator from the bit upper bound of the partial sum.

11. The data processing device according to claim 10, wherein the first operation circuit comprises a multiplier, the first operation result is the multiplication of the input data and the weight.

12. The data processing device according to claim 10, wherein the distribution information of the feedforward result at least comprises a mean and a standard deviation, and the bit upper bound of the partial sum is determined according to the mean and the standard deviation.

13. The data processing device according to claim 12, wherein the bit upper bound of the partial sum is related to a binary logarithm of a value which is the mean plus N times of the standard deviation, N is an integer.

14. The data processing device according to claim 10, wherein the input data and the weight are in a form of integer, the first operation result, the second operation result, the third operation result, and the fourth operation result are in the form of integer.

15. The data processing device according to claim 10, wherein a value of the bit upper bound is equal or smaller than a bit width of an accumulator in hardware.

16. The data processing device according to claim 10, wherein the second operation circuit comprises an adder which adding the second operation result and the third operation result.

17. The data processing device according to claim 16, wherein the second operation circuit further comprises a second saturation circuit which performs saturation procedure on an output of the adder.

* * * * *